United States Patent [19]

Hutchinson et al.

[11] Patent Number: 5,143,342
[45] Date of Patent: Sep. 1, 1992

[54] VIBRATION DAMPENED DUAL MIRROR APPARATUS FOR A VEHICLE

[76] Inventors: Franklin D. Hutchinson, 28000 Bell, New Boston, Mich. 48164; William Schmidt, 21000 Woodruff, Rockwood, Mich. 48173

[21] Appl. No.: 685,138

[22] Filed: Apr. 15, 1991

[51] Int. Cl.$^5$ ............................................. A47G 1/24
[52] U.S. Cl. ..................... 248/476; 359/844
[58] Field of Search ............... 248/477, 549, 475.1, 248/479, 480, 485, 486, 487, 476, 900; 350/632, 636

[56] References Cited

U.S. PATENT DOCUMENTS

| | | | |
|---|---|---|---|
| 2,708,086 | 5/1955 | Prutzman | 248/485 |
| 2,783,015 | 2/1957 | Kampa | 248/485 X |
| 3,107,077 | 10/1963 | Lassa | 248/485 X |
| 4,156,557 | 5/1979 | Skewis | 248/485 X |
| 4,258,983 | 3/1981 | Johnson | 350/632 |
| 4,306,701 | 12/1981 | Nierhaus | 248/479 |
| 4,747,679 | 5/1988 | Beach | 350/632 |
| 4,784,011 | 11/1988 | Riley | 248/479 X |
| 4,804,257 | 2/1989 | Schmidt | 350/632 X |
| 4,830,326 | 5/1989 | Schmidt | 248/479 |

FOREIGN PATENT DOCUMENTS

| | | | |
|---|---|---|---|
| 651808 | 11/1962 | Canada | 248/900 |
| 2579148 | 9/1986 | France | 350/632 |

Primary Examiner—J. Franklin Foss
Attorney, Agent, or Firm—Weintraub, DuRoss & Brady

[57] ABSTRACT

A vibration dampening apparatus for a vehicular dual mirror assembly. The apparatus includes a first and second mirror assemblies having independent spaced legs extending outwardly and being interconnected by an elongated vibration dampening rod and clamping brackets to secure the apparatus to a vehicular mounting bar. The legs of the mirror assembly, and the associated clamping brackets and the vibration dampening rod function together to dampen the vibrations. The mirrors may be pivoted about the longitudinal axis of each leg.

5 Claims, 2 Drawing Sheets 5,143,342

VIBRATION DAMPENED DUAL MIRROR APPARATUS FOR A VEHICLE

BACKGROUND OF THE INVENTION

1. Field of the Invention

The present invention relates to mirror assemblies. More particularly, the present invention relates to vibration dampened vehicular mirror assemblies. Even more particularly, the present invention concerns vibration dampened dual vehicular mirror apparatus or assemblies.

2. Prior Art

As is known to those skilled in the art, dual outside mirror assemblies enable drivers of large vehicles, such as tractor trailers, large single body trucks, school busses, van-type vehicles, and other vehicles to have a field of view rearward visibility from the driver's seat is restricted. Traditionally, vehicles are used on various on-road and off-road conditions which cause the vehicle and, thus, the mirrors to vibrate vertically. The surface vibrations of the mirrors impair the driver's vision and disrupt the field-of-view. Thus, the prior art has attempted to minimize or eliminate these vibrations.

Traditionally, the prior art efforts to limit or eliminate mirror surface vibration was accomplished either by adding additional and extensive support structures or by designing complicated mirror support connections. In most cases, the rigidity remained or was exacerbated by an excessive number of joints or connections which either required service or simply just did not eliminate vibration.

A step toward resolving the above problems is found in U.S. Pat. No. 4,830,326, issued to W. Schmidt and F. Hutchinson, on Jun. 16, 1989, wherein a vibration dampening apparatus includes an adjustable mirror support bar which is separate, but attachable, to the vehicle mirror assembly mounting bar. As a result of this invention, vibrations are lessened, but there remain at least nine fastening locations that require continuous service.

It would, therefore, be desirable to provide a mirror apparatus which limits the effects of vehicle vibration at the mirror surface, but which require only a minimum amount of continuous service caused by movement at fastening locations. It is to this to which the present invention is directed.

SUMMARY OF THE INVENTION

The instant invention provides a vibration dampened dual mirror apparatus including a means for dampening vibrations and which is intended to be used or mounted onto a vehicle.

The dual mirror apparatus hereof comprises:
(a) first and second spaced apart mirror assemblies, each having a visual reflective surface on at least one side thereof;
(b) means for supporting the first and second mirror assemblies;
(c) means for attaching each mirror assembly to the means for supporting;
(d) means for dampening vibrations of the first and second mirror assemblies; and
(e) means for connecting the mirror apparatus to a support surface.

Each mirror assembly is attached to a means for supporting it and which comprises a support arm. The support arm has a first leg and a second leg. The first leg has a first flange disposed thereon which extends substantially perpendicular to a second leg. The flange and second leg form a generally "L-shaped" arm or bar. The mirror assemblies attach to the second leg of the support arm and the first leg of the support arm clamps to a vehicle mounting means.

The present invention, also, includes means for attaching the second leg of the support arm to the mirror assemblies. The means for attaching, generally, comprises a clamping cover which is removably fastened to the mirror assemblies.

The present apparatus, also, includes second means for attaching to allow the first and second mirror assemblies to be mounted to a vehicular mounting bar. The second means for attaching includes the first leg or flange end of the support arm and a clamping bracket.

The means for dampening vibrations includes an elongated bar. Each end of the bar has a flange end formed thereon. The first flange end is attached to the support arm of the first mirror assembly and the second flange end is attached to the support arm of the second mirror assembly using the same fastener.

The various features, advantages, and other uses of the present invention will become more apparent by referring to the following detailed description and drawing in which like reference characters refer to like parts throughout the several views, in which:

DESCRIPTION OF THE PREFERRED EMBODIMENT

Figure 1:
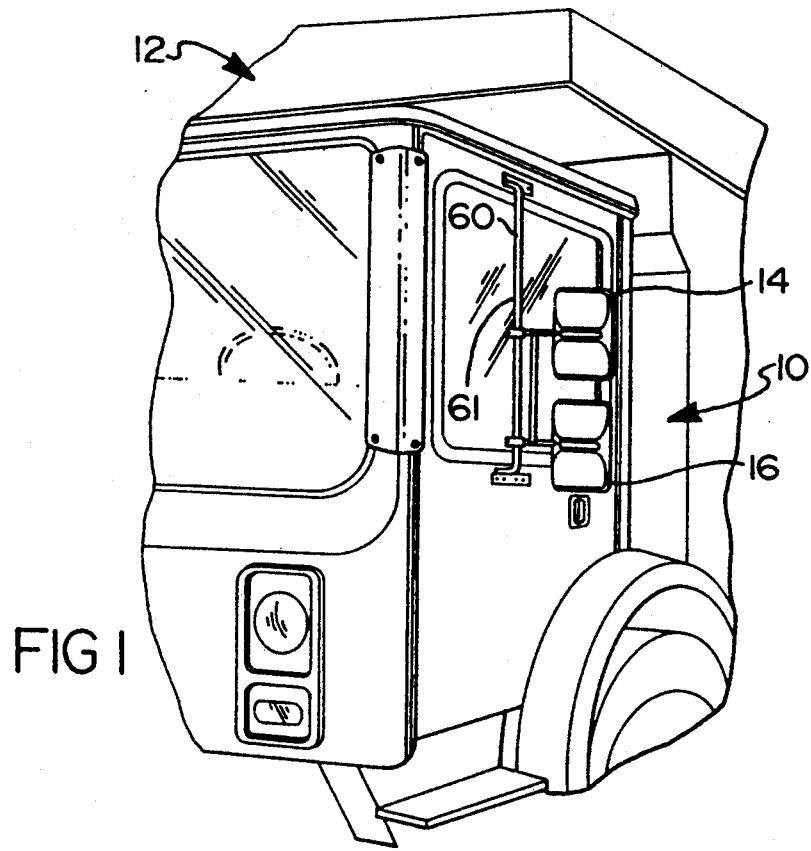
FIG. 1 is a partial, perspective view showing the mounting of the mirror apparatus of the present invention on a side window of a vehicle.

Referring now to the drawing and in particular to FIGS. 1-4, there is illustrated a vibration dampening dual mirror apparatus 10 in accordance with the present invention. The present apparatus 10 is particularly suited for deployment with a vehicle 12.

It will be understood that although the mirror apparatus 10 of the present invention is advantageously used with large vehicles, such as semi-trucks and trailers and large single body trucks, it may also be employed on other vehicles where mirror vibration poses a problem. Also, the mirror apparatus 10 may be employed on the exterior sides of either or both of the driver or passenger side of the vehicle 12. Likewise, the present invention may be deployed in other environments wherein dampening of reflective surface vibration is desired.

Figure 2:
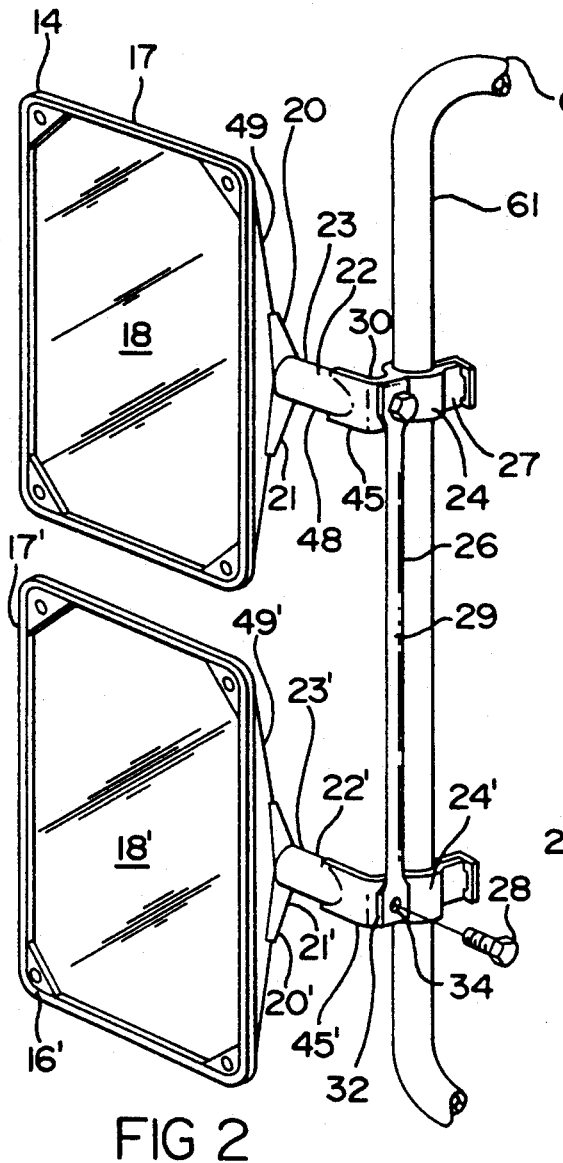
FIG. 2 is a perspective, partially exploded assembly view showing the front of the mirror apparatus of the present invention.

As shown in FIGS. 1 and 2, the mirror apparatus 10 hereof comprises: (a) first and second mirrors or mirror assemblies 14 and 16, respectively; (b) means 22, 22', respectively, for supporting the first and second mirror assemblies 14 and 16; (c) means 20, 20' for attaching each mirror assembly 14, 16 to the means for supporting 22, 22'; (d) means 26 for dampening vibrations; and (e) means 60 for attaching the apparatus 10 to the vehicle 12 or other support surface.

It is to be noted that each mirror assembly 14 and 16 is similarly constructed. Thus, each assembly 14 or 16 includes a mirror body 17 or 17' which may be formed of any suitable material, such as plastic, lightweight metal, etc. The body 17 or 17' may have any general size or shape, such as rectangular, square, circular, etc., as desired by the operator of the vehicle, for safe operation of the vehicle or to meet governmental requirements. The body 17 or 17' has a mirror reflective surface 18 or 18' mounted thereon. Thus, as used herein, the term "mirror" or "mirror assembly" 14 or 16 includes the body 17, 17' and the reflective surface 18, 18'.

It should be noted, and as shown in FIGS. 1-4, the first and second mirror assemblies 14 and 16 are illustrated and described hereafter as having a generally identical rectangular shape. Other combinations, such as an upper mirror assembly 14 of one configuration and a different sized and configured lower mirror assembly 16, or vice-versa, may also be employed depending upon the application of the mirror apparatus 10 of the present invention.

Also, the exterior surface of each reflective surface 18, 18' may have any particular form, such as a planar form as shown in FIG. 2, or a convex, outwardly extending shape depending upon the particular application.

Figure 3:
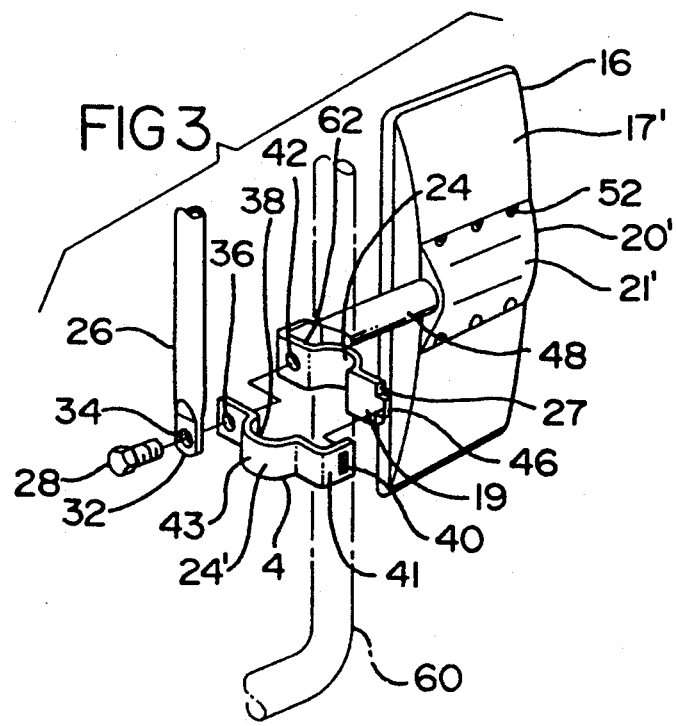
FIG. 3 is a perspective, exploded, partially broken view showing the lower or second mirror of the present invention as it is assembled to a vehicular mounting bar; and, FIG. 4 is a rear elevational view of the mirror apparatus of the present invention.

Returning to the drawing, and in particular FIG. 3, and as shown therein, associated with each mirror assembly 14, 16 is the means 22 for supporting the mirror assemblies 14 and 16, respectively. Each means for supporting comprises a support arm generally denoted at 23, 23', respectively. Each support arm 23, 23' comprises an L-shaped bar 45, 45' having a flattened flanged first leg 19 and a tubular second leg 48.

The flanged first leg 19 has a first section 62, a middle section 24, and an end section 27. The first section 62 is integral to the second leg 48 and includes an aperture 42 therein for receiving a means for fastening. The middle section 24 is concave, semicircular to accommodate the means for mounting 60 on the vehicle 12. The end section 27 has an end tab 46 formed thereon and extending from the end of the flanged leg 19.

The tubular leg 48 is bent at a gradually increasing angle until it extends substantially perpendicular to the longitudinal axis of the flange leg 19. The support arms 23, 23' function to assist in vibration dampening as well as providing structural support for the associated mirror assemblies 14 and 16.

Figure 4:
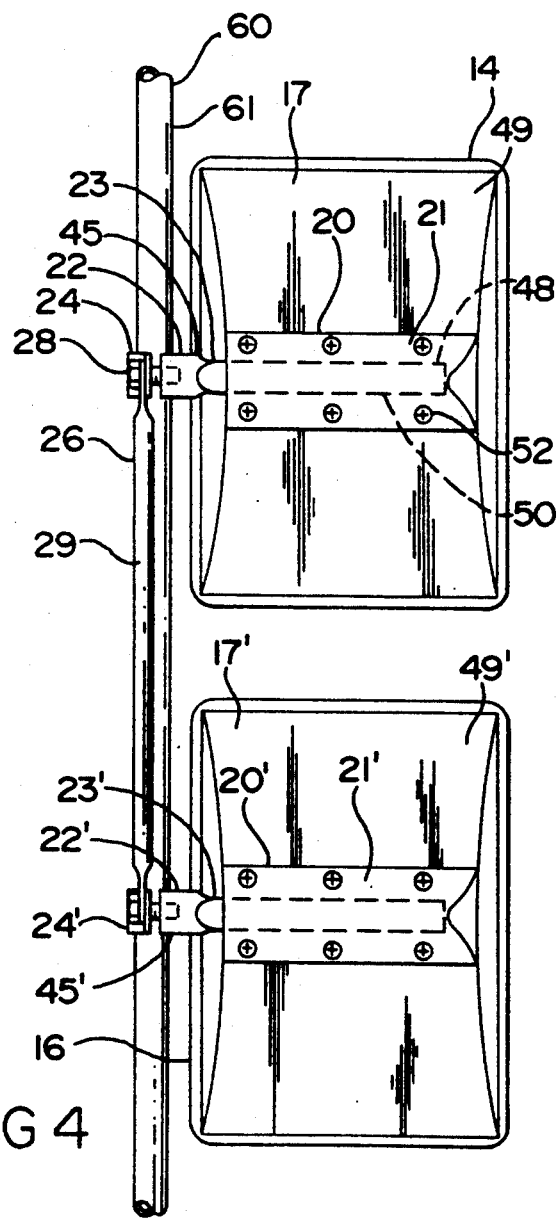

Each means for attaching 20, 20' for the mirror assemblies 14 and 16 and the support arm bars 23, 23', as shown in FIGS. 3 and 4, include a substantially V-shaped clamping cover 21, 21" formed of the same material as the body 17 and 17' of the mirror assemblies 14 and 16. Each cover 21 or 21' is secured to a central laterally extending portion of the back surface 49, 49' of the associated mirror assembly 14, 16. A bore 50 extends generally longitudinally partially through the clamping cover 21, 21' and partially through the back surface 49, 49' of the mirror assembly body 17, 17' to removably receive the tubular leg 48 of the support arm, or support arm bar 23.

Means for fastening, such as a plurality of threaded fasteners 52, are provided along the length of the clamping cover 21, 21' and which are received in threaded apertures (not shown) in cover 21, 21' and in associated, registering threaded apertures (not shown) in the body 17, 17' of the mirror assemblies 14 and 16 to provide predetermined pressure on the secured ends of the tubular leg 48. This allows the mirror assemblies 14 and 16 to be pivotally positioned about the axis of the tubular leg 48 of the support arm 23, 23' as desired by the occupant of the vehicle 12.

As noted, means 60 are also provided for attaching or connecting the dual mirror vibration dampening apparatus 10 to the vehicle 12. As shown in the FIG. 1, the means for attaching or connecting comprises a vertically extending vehicular mounting bar 61. The bar 61 is typically a hollow, tubular, metallic material which is disposed proximate with and secured to the vertical side surface of the operator's compartment of the vehicle 12 by a suitable means for attaching.

As shown in FIGS. 2 and 3, the preferred means for attaching also comprises an arcuately shaped and planar clamping bracket 24, 24'. The bracket 24 or 24' includes a first leg 38 having an aperture 36 for receiving a suitable fastener such as a bolt 28 and a convex semi-circular middle section 43 and a second leg 40 substantially perpendicular to the first leg 38 and projecting away from the middle section 43. The second leg 40 has an elongated rectangular aperture 41 formed therethrough for receiving a tab 46 disposed on the end of the flange leg 19 of the support arm 23. When assembled the tab 46 extends into the aperture 41 in the second leg of the bracket 24 or 24'.

The means for dampening vibrations 26, as shown in FIG. 2 and 4, comprises an elongated dampening tubular rod 29 which has a first flange end 30 and a second flange end 32. Each flange end 30 and 32 has an aperture 34 formed therethrough for receiving suitable fasteners, such as a bolt 28 or the like. The vibrations dampening rod 29 is cooperatively connected to both mirror assemblies 14 and 16 through the supporting arms 23, 23' and the clamping brackets 24, 24'. The first flange end 30 is connected with the mirror assembly 14 and the second flange end 32 with the mirror assembly 16, when the dual mirror vibration dampening apparatus 10 is attached to the vehicular mounting bar 61.

The dual mirror vibration dampening apparatus 10 is securely attached to the vehicle 12 for normal use in rear viewing by the occupants of the forward passenger compartments of the vehicle 12. Vibration free positioning of the separate mirror assemblies 14 and 16 is made possible by the interconnected vibration dampening rod 29 which dampens harmonic vibrations caused by movement of the vehicle 12. The means 28 for fastening the support arm bars 23, 23' clamping brackets 24, 24' and vibration dampening rod 29 greatly reduces the number of fasteners. This reduces the need for extensive assembly and reduces the number of areas to be services. Also, the vibration dampening dual mirror apparatus 10 enables the operator or passenger of the vehicle 12 to selectively position the upper mirror 14 at a different angle with respect to the lower mirror 16.

Having, thus, claimed the invention, what is claimed is:

1. A vibration dampened dual mirror apparatus for a vehicle comprising:
   (a) first and second spaced apart mirror assemblies, each having a visual reflective surface on at least one side thereof;
   (b) means for supporting each mirror assembly comprising:
      (1) a support arm for each mirror assembly, each arm having a first leg and a second leg, the second leg removably attached to an associated mirror assembly;

(2) a clamping bracket for each support arm removably attached to the first leg;

(c) means for attaching each mirror assembly to the support arm comprising:
  (1) a cover for covering the support arm; and
  (2) means for fastening the cover to the mirror body;

(d) means for dampening vibrations to the mirror assemblies comprising:
  (1) a vertically extended elongated rod having a first flanged end and a second flanged end, the first flanged end being connectable to the first mirror assembly arm and associated clamping bracket, the second flange end being connectable to the second mirror assembly support arm and associated clamping bracket;

(e) means for mounting the dampening apparatus to the surface of a vehicle comprising:
  (1) a mounting bar extending substantially parallel to the mounting surface having an upper end, a middle section and a lower end, the upper and lower ends removably attached to the vehicle, the middle section removably attached to the first mirror assembly support arm and their associated clamping brackets; and
  (2) a means for attaching the first and second end of the mounting bar to the vehicle.

2. The vibration dampened dual mirror apparatus of claim 1 wherein the support arm of the means for supporting further comprises:
  (a) a tubular leg defining the second leg; and
  (b) a tubular leg defining the second end.

3. The vibration dampened dual mirror apparatus of claim 2 wherein the support arm first end flange further comprises a first section, a middle section and an end section, the first section with an aperture therein, the middle section concave semi-circle formed for mounting onto the means for mounting and the third section having a tab formed thereon extending from the end of the flange leg for the support arm.

4. The vibration dampened dual mirror apparatus of claim 1, wherein the clamping bracket of the means for attaching comprises a first leg, a middle section and a second leg, the first leg having an aperture therein for receiving a means for fastening, the middle section being convex semicircular formed and the second leg substantially perpendicular to the first leg and projecting away from the middle section, the second leg having an elongated aperture therein for insertion of the tab on the support arm.

5. The vibration dampened dual mirror apparatus of claim 1 wherein the elongated rod of the means for dampening comprises a first flanged end and a second flanged end, the first flanged end having an aperture therein for receiving a fastening means to cooperatively connecting the first flanged end to the support arm of the first mirror assembly and its associated clamping bracket, the second flanged end having an aperture therein for receiving a fastening means to cooperatively connect the second flanged end to the support arm for the second mirror assembly and its associated clamping bracket.

* * * * *